United States Patent
Omekanda et al.

(10) Patent No.: US 10,574,116 B2
(45) Date of Patent: Feb. 25, 2020

(54) STARTER INCLUDING A SWITCHED RELUCTANCE ELECTRIC MOTOR

(71) Applicant: GM Global Technology Operations LLC, Detroit, MI (US)

(72) Inventors: Avoki M. Omekanda, Rochester, MI (US); Lei Hao, Troy, MI (US); Chandra S. Namuduri, Troy, MI (US); Suresh Gopalakrishnan, Troy, MI (US); Thomas W. Nehl, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 135 days.

(21) Appl. No.: 15/961,119

(22) Filed: Apr. 24, 2018

(65) Prior Publication Data

US 2019/0326842 A1 Oct. 24, 2019

(51) Int. Cl.
*H02K 7/20* (2006.01)
*H02K 1/08* (2006.01)
(Continued)

(52) U.S. Cl.
CPC ........... *H02K 7/20* (2013.01); *F02N 11/0855* (2013.01); *H02K 1/08* (2013.01); *H02K 11/215* (2016.01);
(Continued)

(58) Field of Classification Search
CPC ........ H02K 7/20; H02K 11/21; H02K 11/215; H02K 11/30; H02K 19/10; H02K 19/103;
(Continued)

(56) References Cited

U.S. PATENT DOCUMENTS

| 4,684,867 A * | 8/1987 | Miller ..................... H02P 3/065 318/701 |
| 5,633,546 A * | 5/1997 | Horst ..................... G01D 5/145 310/68 B |

(Continued)

FOREIGN PATENT DOCUMENTS

| CN | 2711983 Y | 7/2005 |
| CN | 101487434 A | 7/2009 |

(Continued)

OTHER PUBLICATIONS

B.Anvari et al. "Simultaneous Optimization of Geometry and Firing Angles for In-Wheel Switched Reluctance Motor Drive" IEEE Transactions on Transportation Electrification, vol. 4, No. 1, Mar. 2018, pp. 322-329. (Year: 2018).*

(Continued)

*Primary Examiner* — Burton S Mullins
(74) *Attorney, Agent, or Firm* — Quinn IP Law

(57) ABSTRACT

A starter includes a three-phase switched reluctance electric motor including a rotor and a stator, a pinion gear, a power inverter that is connected to the stator, and a rotational position sensor. The rotor includes a quantity of rotor poles that is between 6 and 16, and the stator includes a quantity of stator poles that is between 8 and 24. An outer diameter of the electric motor is less than 85 mm. An active length of the motor is less than 50 mm. An airgap distance between the rotor and the stator is between 0.1 mm and 0.5 mm. A ratio between a rotor pole arc and a stator pole arc is at least 1.0:1. A ratio between a stator diameter and a rotor diameter is at least 2.0:1, and a ratio between a stator pole height and a rotor pole height is at least 2.5:1.

20 Claims, 6 Drawing Sheets

(51) Int. Cl.
*F02N 11/08* (2006.01)
*H02K 19/10* (2006.01)
*H02K 11/215* (2016.01)
*H02K 11/30* (2016.01)
*H02P 25/092* (2016.01)

(52) U.S. Cl.
CPC ........... *H02K 11/30* (2016.01); *H02K 19/103* (2013.01); *H02K 2213/03* (2013.01); *H02P 25/0925* (2016.02)

(58) Field of Classification Search
CPC ........ H02K 29/00; H02K 29/06; H02K 29/08; H02K 29/12; F02N 11/00
USPC ...... 310/68 B, 162, 216.075; 74/6, 7 R, 7 A, 74/7 B, 7 C, 7 D, 7 E, 8, 9
See application file for complete search history.

(56) References Cited

U.S. PATENT DOCUMENTS

| | | | | |
|---|---|---|---|---|
| 6,593,720 | B2* | 7/2003 | Omekanda | H02P 25/098 318/434 |
| 6,699,081 | B1* | 3/2004 | Divljakovic | F02B 61/045 440/1 |
| 6,856,108 | B2* | 2/2005 | Kim | H02K 11/00 318/254.1 |
| 6,857,981 | B2* | 2/2005 | Hori | F16H 61/32 475/149 |
| 7,064,462 | B2* | 6/2006 | Hempe | B23D 45/16 173/217 |
| 7,258,086 | B2* | 8/2007 | Fitzgerald | F01B 9/047 123/46 R |
| 8,004,135 | B2* | 8/2011 | Peterson | H02K 11/33 310/156.05 |
| 8,544,580 | B2* | 10/2013 | Cheng | H02P 25/08 180/65.51 |
| 8,581,452 | B2* | 11/2013 | Roopnarine | H02K 1/02 310/45 |
| 8,633,624 | B2* | 1/2014 | Knight | H02K 5/20 310/53 |
| 8,922,153 | B2* | 12/2014 | Nashiki | H02K 19/103 318/701 |
| 9,121,380 | B2 | 9/2015 | Fulton | |
| 9,559,570 | B2* | 1/2017 | Spearman | F02N 11/04 |
| 9,929,620 | B2* | 3/2018 | Nakamura | H02K 9/19 |
| 2014/0184131 | A1* | 7/2014 | Baek | H02P 25/08 318/701 |
| 2014/0260792 | A1* | 9/2014 | Bradfield | F02N 11/0855 74/7 A |
| 2018/0030944 | A1 | 2/2018 | Raad | |

FOREIGN PATENT DOCUMENTS

| | | | | |
|---|---|---|---|---|
| EP | 0619427 | B1 | 10/1994 | |
| GB | 2521662 | A * | 7/2015 | ........... G01R 33/025 |
| JP | 2000104650 | A | 4/2000 | |
| JP | 2003148317 | A | 5/2003 | |

OTHER PUBLICATIONS

V.Petrus et al. "Design and Comparison of Different Switched Reluctance Machine Topologies for Electric Vehicle Propulsion" XIX International Conf.on Electrical Machines, 2010. (Year: 2010).*
J.Jiang et al. "Design Optimization of Switched Reluctance Machine using Genetic Algorithm", IEEE International Electric Machines & Drives Conference, 2015 (Year: 2015).*
J.Faiz et al. "Aspects of Design Optimisation for Switched Reluctance Motors", IEEE Transactions on Energy Conversion, vol. 8, No. 4, Dec. 1993. (Year: 1993).*
S.Mahmoud et al. "Studying Different Types of Power Converters Fed Switched Reluctance Motor", Int'l Journal of Electronics and Electrical Engineering, vol. 1, No. 4, Dec. 2013, pp. 281-290 (Year: 2013).*
A.M.Omekanda, "Switched Reluctance Machines for EV and HEV Propulsion: State-of-the-Art", IEEE Workshop on Electrical Machines Design, Control and Diagnosis, Mar. 2013. (Year: 2013).*
K.Ohyama et al. "Design using Finite Element Analysis of Switched Reluctance Motor for Electric Vehicle", 2006 2nd International Conference on Information & Communication Technologies, vol. 1, pp. 727-732. (Year: 2006).*
L.Weili et al., "Optimal design and finite element analysis of switched reluctance motor for electric vehicles", 2008 IEEE Vehicle Power and Propulsion Conference, Sep. 2008. (Year: 2008).*
Quanbao Zhou, John Houldcroft, "Cold engine cranking torque requirement analysis," SAE International Inc., 2007, JSAE 20077002.

* cited by examiner

STARTER INCLUDING A SWITCHED RELUCTANCE ELECTRIC MOTOR

INTRODUCTION

Internal combustion engines may have an electric starter that is disposed to turn a crankshaft leading up to a start event.

SUMMARY

A starter for an internal combustion engine is described, and includes a three-phase switched reluctance electric motor including a rotor and a stator, a pinion gear that is coupled to the rotor of the switched reluctance electric motor, a power inverter that is connected to the stator of the three-phase switched reluctance electric motor, a rotational position sensor that is disposed to monitor rotation of the rotor, and a controller in communication with the inverter. The rotor includes a quantity of rotor poles that is between 6 and 16, and the stator includes a quantity of stator poles that is between 8 and 24. An outer diameter of the three-phase switched reluctance electric motor is less than 85 mm. An active length of the switched reluctance electric motor is less than 50 mm. An airgap distance between the rotor and the stator is between 0.1 mm and 0.5 mm. A ratio between a rotor pole arc and a stator pole arc is at least 1.0:1. A ratio between a stator diameter and a rotor diameter is at least 2.0:1, and a ratio between a stator pole height and a rotor pole height is at least 2.5:1.

An aspect of the disclosure includes the quantity of stator poles differs from the quantity of rotor poles.

Another aspect of the disclosure includes the quantity of stator poles being 18 and the quantity of rotor poles being 12.

Another aspect of the disclosure includes the quantity of stator poles being 24 and the quantity of rotor poles being 16.

Another aspect of the disclosure includes the pinion gear being disposed to translate along a rotatable member coupled to the rotor.

Another aspect of the disclosure includes the multi-phase switched reluctance electric motor being a three-phase switched reluctance electric motor.

Another aspect of the disclosure includes a rotational position sensor being disposed to monitor rotation of the rotor.

Another aspect of the disclosure includes the power inverter connected to the stator of the switched reluctance electric motor including first, second and third power switches electrically connected between the DC power source and corresponding stator poles associated with respective first, second and third phases of the switched reluctance electric motor.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 3-1 is a cutaway side-view of the switched reluctance electric motor, in accordance with the disclosure;

FIG. 3-2 is a cutaway end-view of the switched reluctance electric motor, in accordance with the disclosure;

FIG. 3-3 is a cutaway side-view of a rotor for the switched reluctance electric motor, in accordance with the disclosure;

FIG. 3-4 is a cutaway side-view of a stator for the switched reluctance electric motor, in accordance with the disclosure;

FIG. 4 is a schematic view of an electronic commutator subassembly for controlling the switched reluctance electric motor, in accordance with the disclosure;

FIG. 5-1 is a schematic end-view of a stator and associated Hall effect sensor assembly for the switched reluctance electric motor, in accordance with the disclosure;

FIG. 5-2 is a schematic end-view of a rotor, Hall effect sensor assembly and associated rotor magnet, in accordance with the disclosure; and FIG. 5-3 is a graphical depiction of signal outputs from the sensor of the Hall effect sensor assembly and associated inductance output from the switched reluctance electric motor shown in relation to rotational position of the rotor, in accordance with the disclosure.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. Furthermore, the disclosure, as illustrated and described herein, may be practiced in the absence of an element that is not specifically disclosed herein.

Figure 1:
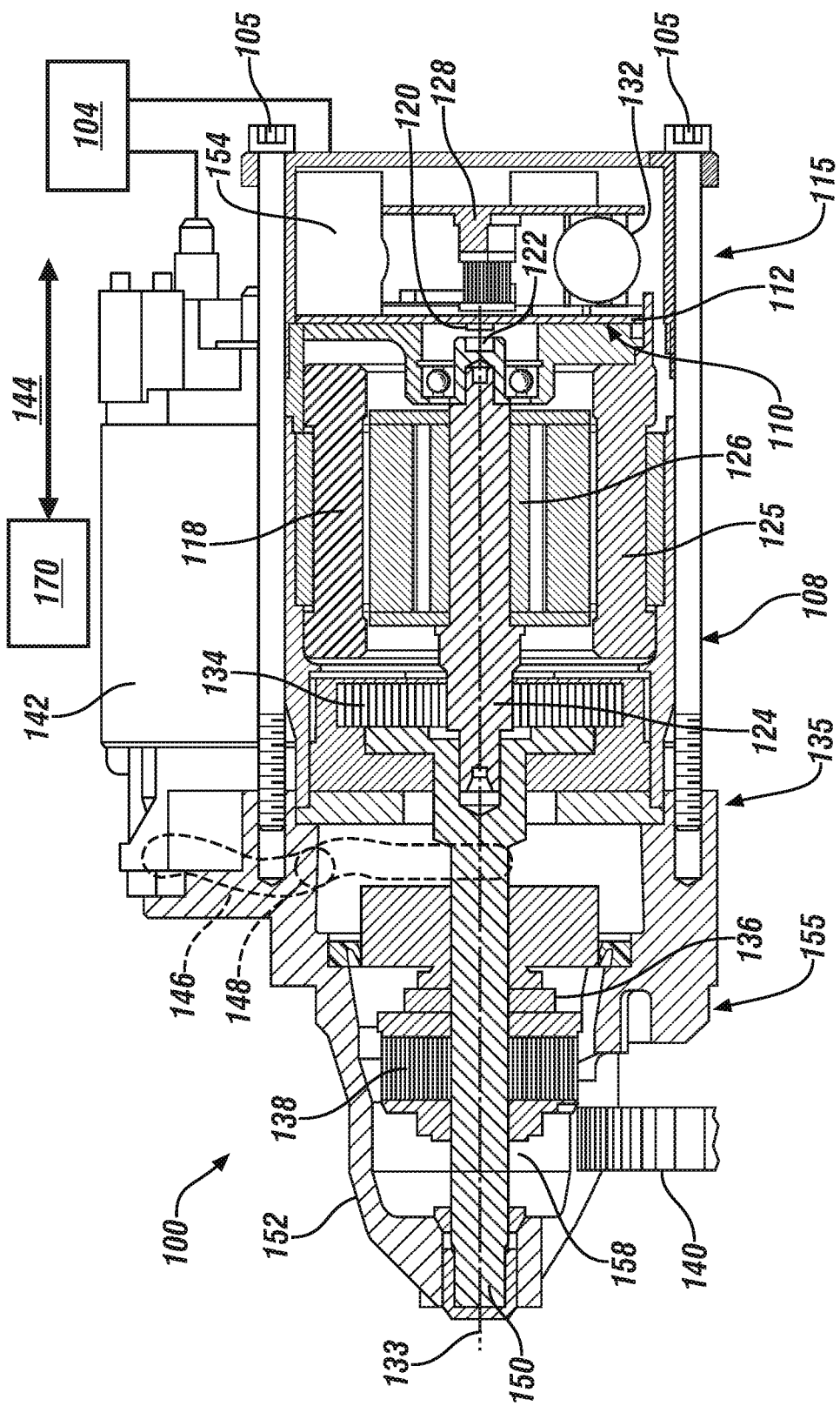
FIG. 1 is a cutaway side-view of an embodiment of a starter, in accordance with the disclosure.
Figure 2:
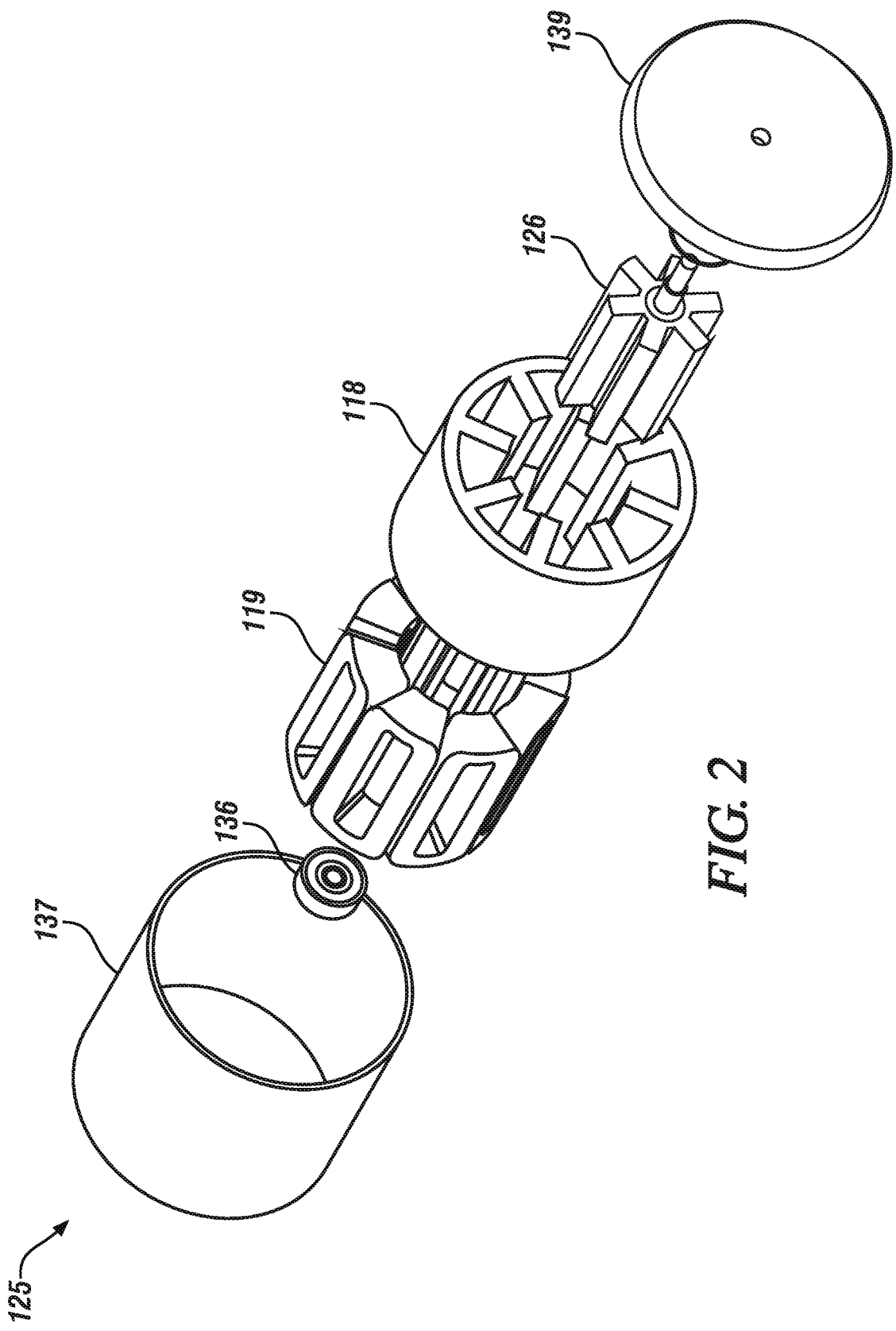
FIG. 2 is an exploded isometric view of a motor subassembly for a switched reluctance electric motor that may be disposed in the starter, in accordance with the disclosure.

Referring to the drawings, wherein like reference numerals correspond to like or similar components throughout the several Figures, FIGS. 1 and 2, consistent with embodiments disclosed herein, illustrate a starter 100 that may be disposed on an internal combustion engine (engine) to provide engine cranking torque as part of an engine starting routine, including being employed in an engine stop-start routine. The engine may be disposed on a vehicle in one embodiment, and the vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. Alternatively, the starter 100 may be disposed on an engine that is employed on a stationary power source.

The starter 100 may be electrically connected, either via a cable or a power bus, to a DC power source 104 and may be in communication with a starter switch directly and/or via a controller 170. The starter 100 includes a switched reluctance electric machine (switched reluctance motor) 125, which is provided to generate engine cranking torque in response to a command to spin the engine.

The starter 100 is advantageously configured as a plurality of subassemblies including a gearbox/mounting subassembly 155 including a single solenoid-actuated pinion drive and planetary gear assembly, a motor subassembly 135 including the switched reluctance motor 125, and an electronic commutator subassembly 115. The gearbox/mounting subassembly 155, the motor subassembly 135, and the electronic commutator subassembly 115 are assembled into a unitary device employing one or a plurality of fasteners 105. This configuration facilitates assembly and testing, and provides high density packaging of power electronic elements, noise filters, controller, and interconnects to reduce EMI. The DC power source 104 is electrically connected to the switched reluctance motor 125 to provide DC current. The DC power source 104 may be a 12V DC voltage level, a 48V DC voltage level, or another DC voltage level.

The gearbox/mounting subassembly 155 includes a housing 152, shaft extension 150, planetary gear set 134, pinion gear 138, one-way clutch 136, pinion control solenoid 142 and a pinion lever control arm 146. The pinion lever control arm 146 is disposed between the pinion control solenoid 142 and the pinion gear 138, and is pivotably secured to the housing 152 via a pivot point 148. The planetary gear set 134 is coupled to a motor output shaft 124 of the switched reluctance motor 125.

Torque output that is generated by the switched reluctance motor 125 is transferred through the motor output shaft 124 to the planetary gear set 134, which provides a gear reduction mechanism to amplify the torque at a reduced speed to crank the engine. In some examples the reduction ratio may range 25:1 and 55:1. Torque transferred by the planetary gear set 134 is passed through the one-way clutch 136. The one-way clutch 136 is configured to lockup and pass torque in a first direction associated with engine cranking, and allow rotational slip in a second, opposite direction, as may happen in an overspeed condition that may be caused by firing of one or more engine cylinders during the starting event. In this way, negative torque is not returned to the switched reluctance motor 125. Additionally, engine overrun conditions may be absorbed at the one-way clutch 136 to compensate for speed undulations and allow engine speed to exceed starter motor speed.

The output torque generated by the switched reluctance motor 125 is transferred to a rotatable engine cranking input element 140 through a pinion gear 138. In one embodiment, the engine cranking input element 140 is a crankshaft of the engine. In one embodiment, the engine cranking input element 140 is a flywheel, belt drive, or chain drive which is coupled to the crankshaft of the engine. The pinion gear 138 is further arranged to translate and index between a first disengaged position and a second engaged position. The pinion control solenoid 142 includes an electrically activated piston having two positions, i.e., extended and retracted positions. The controller 170 may communicate a pinion control signal 144 to energize and de-energize the solenoid 142. In some examples, the pinion control signal 144 is coordinated with the motor operation signals. In alternate examples, the pinion control signal 144 may be provided by another propulsion system controller external to the starter motor subassembly 108. A pinion lever control arm 146 is disposed between the pinion control solenoid 142 and the pinion gear 138. When the pinion control solenoid 142 is de-energized, the piston is in the retracted position and the pinion gear 138 is retracted and disengaged. When the pinion control solenoid 142 is energized, the piston is moved to the extended position and the pinion gear 138 is extended and engaged. Energizing the pinion control solenoid 142 actuates a first end of the lever control arm 146, which pivots about pivot point 148, and an opposite end of the lever control arm 146 moves the pinion gear 138 to the second engaged position. In one example the pinion gear 138 is arranged to slide along the shaft extension 150 to index between the first disengaged position and the second engaged position. The housing 152 includes an opening 158 that allows the pinion gear 138 to engage the engine cranking input portion 140 to provide cranking torque.

The electronic commutator subassembly 115 includes an electronic motor control unit (MCU) 128, a power inverter 110, and a rotational position sensor 120 that are integrated as a single unit that can be assembled onto the motor subassembly 135. The electronic commutator subassembly 115 is depicted as being coaxial relative to a center axis of rotation 133. Alternatively, one or more portions of the electronic commutator subassembly 115 may be arranged to be off-axis relative to the center axis of rotation 133 of the switched reluctance motor 125. In other alternative embodiments, the electronic commutator subassembly 115 is configured to be arranged as a standalone controller that is physically separated from the motor subassembly 135. Alternatively, the elements of the electronic commutator subassembly 115 may be integrated into the controller 170, which may be an engine control unit (ECU) controller. The electronic commutator subassembly 115 includes a power management portion including the power inverter 110 to convert direct current into three-phase alternating current to drive the switched reluctance motor 125. The power inverter 110 may be integrated as part of a printed circuit board (PCB) 112 that is provided to manage a power portion of the electronic commutator subassembly 115.

The PCB 112 is connected to the stator windings 119 of the switched reluctance motor 125 to pass pulsewidth-modulated three-phase alternating current through electrical terminals. The switched reluctance motor 125 may also include one or more position sensors 120 to detect the rotation and position of the rotor 126. In some examples, the position sensor 120 is a Hall effect sensor disposed on the PCB 112 and arranged to pick up the presence of a position target that can be in the form of one or more position magnets 122 disposed on a portion of the motor output shaft 124 of the rotor 126. The position magnet 122 may be located to be concentric to the axis of rotation 133 of the motor output shaft 124. The magnetic field of the position magnet 122 rotates along with the rotor 126 (and output shaft 124) thus changing polarity direction and thereby providing input to the position sensor 120 to indicate a change in rotational position of the rotor 126. The position sensor 120 is arranged at a predetermined axial spacing from the magnet based on the type of magnet and the strength of the magnetic field. In one embodiment and as shown, the position magnet 122 may be arranged as a diametrically magnetized magnet that is disposed on an end of the motor output shaft 124, and the position sensor 120 is disposed in an on-axis arrangement on the PCB 112. Alternatively, the position magnet 112 may be arranged as a radially magnetized magnet (not shown) that is disposed on an end of the motor output shaft 124 and the position sensor 120 is arranged in an off-axis arrangement at a predetermined radial spacing from the magnet that is disposed on the PCB 112.

Embodiments of the position sensor 120 include raw angular position sensors that monitor a target to provide an incremental or absolute position signal. A position signal from an absolute position sensor is proportional to a true position regardless of whether the motor output shaft 124 is stationary or moving. An incremental position sensor detects positional changes. In one embodiment, the position sensor 120 includes the multiplying encoder or digital Hall sensors, e.g., using polymer-bonded, multi-pole magnets, and in which encoder/Hall pulses and commutation pulses are generated as signal outputs. The position sensor 120 may also include an intelligent microprocessor-based chip to extract and transmit the position signals. Another embodiment of a position sensor is an analog Hall effect sensor, e.g., one using targets formed from neodymium magnets, or other field-based sensors operable for generating sine and cosine signals as sensor outputs. Other position sensor types generating similar sine and cosine outputs include inductive-type and reluctance-type position sensors.

The electronic commutator subassembly 115 also includes at least one processor such as motor control unit (MCU) 128, which includes gate drivers to accept low-power motor control signals from an external controller to activate the switched reluctance motor 125. The MCU 128 also regulates high-current drive inputs from the power source 104 to operate the power inverter 110. The MCU 128 is in communication with the power source 104 and may receive signals indicative of performance of the power source, such as battery state of charge, voltage feedback, current feedback or other parameters. The MCU 128 may transmit signals indicating the timing of an engine restart to be used as an input to other functions of a vehicle propulsion system such as transmission shift scheduling, hybrid vehicle propulsion mode selection, and power regeneration for example.

In some examples the MCU 128 is a processor disposed on a control board 132 that is spaced from the power management portion. The MCU 128 may include a digital signal processor (DSP) microcontroller or an application-specific integrated circuit (ASIC) for example. The spacing between the control portion and the power portion is arranged to assist with thermal management of the control board 132 by allowing heat generated from the power management portion to sufficiently dissipate without affecting the operation of the MCU 128. Also, the spacing reduces interference at the MCU 128 related to electrical noise that may be generated by the switches of the power inverter 110. Signals indicative of the starter system operation are transmitted to the control board 132. Commands are sent from the MCU 128 to switches of the power inverter 110. Operation of the inverter switches may be based on a combination of rotor position, temperature, motor feedback current, battery feedback current, battery voltage, ECU signals, or other parameters. The power management portion may also include one or more capacitors 154 which operate as filters to smooth the PWM current output from the switches. In some alternate examples, power filtering portions of the electronics may be located external to the housing of the electronic commutator subassembly 115.

FIG. 2 depicts an exploded isometric view of the motor subassembly 135 to illustrate details associated therewith, including the switched reluctance motor 125 having an annular-shaped stator 118 and rotor 126 mounted on the motor output shaft 124 that defines an axis of rotation 133, a plurality of stator windings 119, and a bearing, all of which are encased within a housing 137 and an accompanying end cap 139. The switched reluctance motor 125 lacks any form of a commutator, permanent magnets, a rotor squirrel cage or other rotor windings. The rotor 126 is formed by a plurality of stacked laminates formed from ferromagnetic material and including a plurality of outwardly projecting rotor poles 127. The stator 118 is formed by a plurality of stacked laminates formed from ferromagnetic material and including a plurality of inwardly projecting stator poles 117, with void regions 116 formed between adjacent stator poles 117. The stator windings 119 are inserted into the void regions 116. The MCU 128 sends commands to the switches of the power inverter 110, which sequentially energizes the stator windings 119 of the switched reluctance motor 125 to generate a rotating electromagnetic field to urge the rotor 126 to rotate. The switched reluctance motor 125 generates torque employing magnetic attraction that is induced on the stator poles 117 and the salient rotor poles 127 formed on the rotor 126, as described herein.

Figures 1, 3:
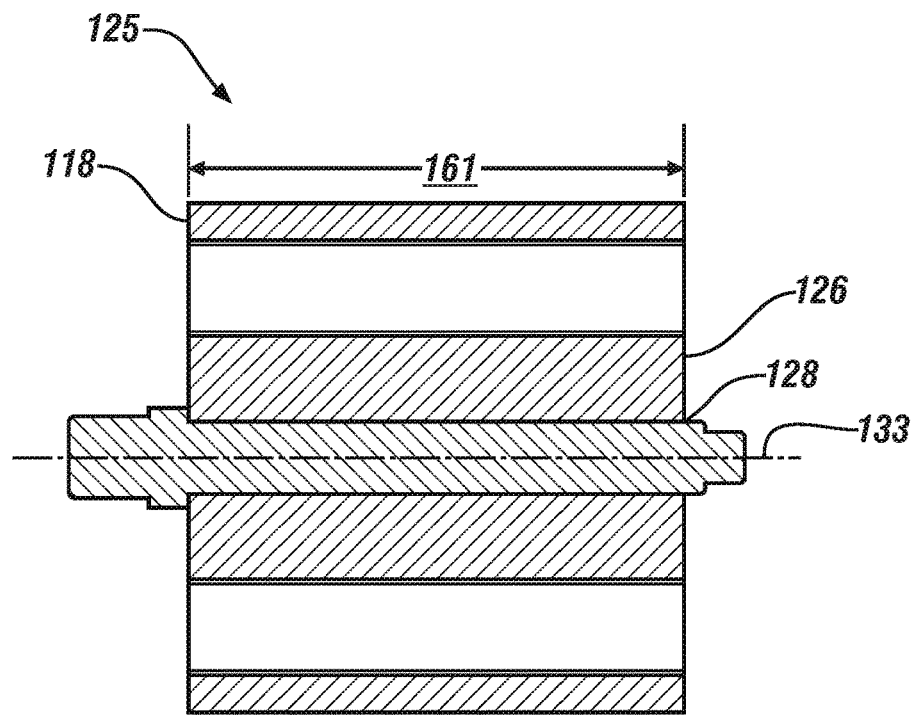
Figures 2, 3:
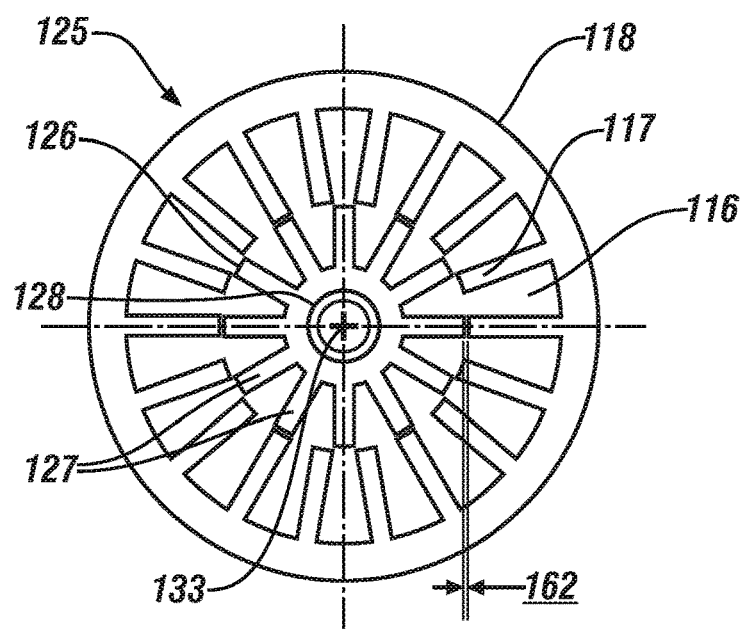
Figure 3:
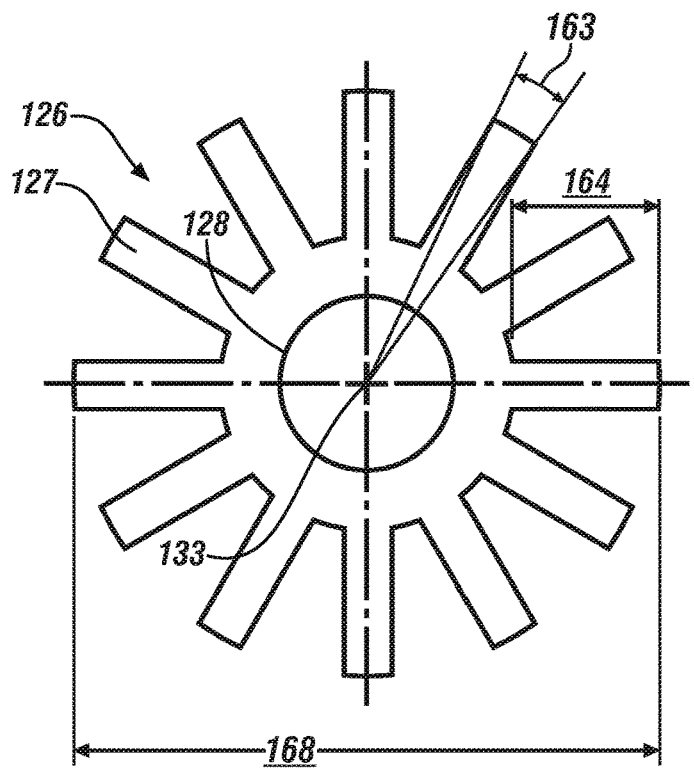
Figures 3, 4:
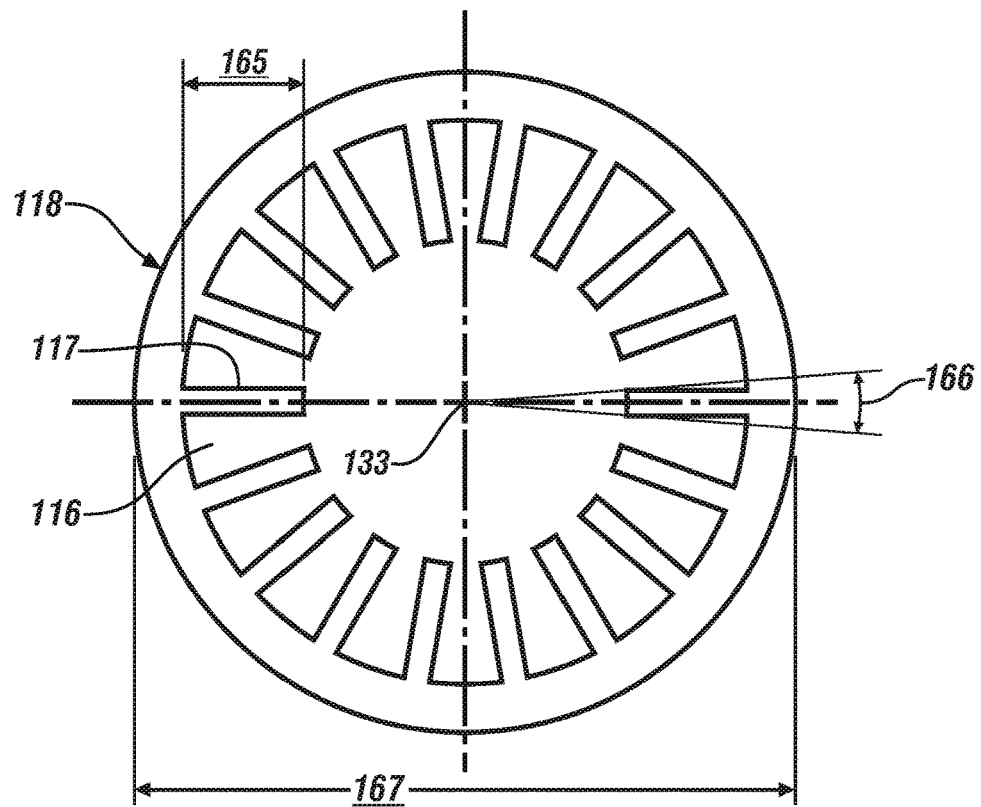
Figure 4:
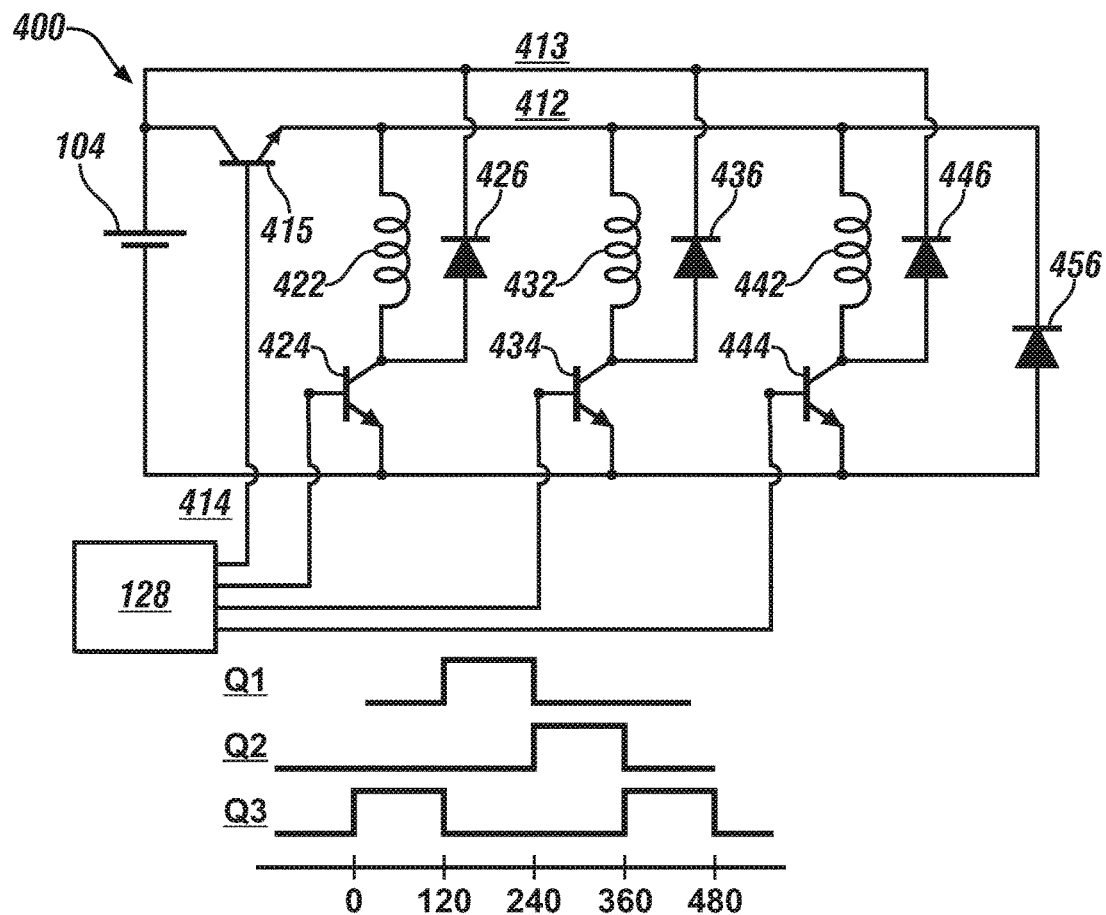

FIGS. 3-1 to 3-4 illustrate aspects of the switched reluctance motor 125 including the stator 118, rotor 126, rotor shaft 124 and axis of rotation 133, including a plurality of critical design dimensions. The stator 118 includes a plurality of radially-oriented inwardly-projecting stator poles 117 with intervening stator voids 116, into which stator coil windings 119 are inserted. The rotor 126 includes a plurality of radially-oriented outwardly-projecting rotor poles 127 that project from the rotor shaft 124. Critical dimensions include as follows:

an active length 161, which is an axial length of the overlap between the stator 118 and the rotor 126;

an airgap length 162, which is a radial length of an airgap between the inwardly-projecting stator poles 117 and the outwardly-projecting rotor poles 127;

an outside diameter 167 of the stator 118;

a rotor pole length 164, which is a radial length of each of the rotor poles 127 projecting from the rotor shaft 124;

a stator pole length 165, which is a radial length of each of the stator poles 117 projecting from an inner surface of the stator 118;

a stator pole arc 166, $A_S$, which is an angle measured between two radial lines projecting from the axis of rotation 133, wherein the two radial lines intersect with respective opposite corner points of one of the inwardly-projecting stator poles 117; and a rotor pole arc 163, $A_R$, which is an angle measured between two radial lines projecting from the axis of rotation 133, wherein the two radial lines intersect with respective opposite corner points of one of the outwardly-projecting rotor poles 127.

The switched reluctance motor 125 is configured as a 3-phase device having a first quantity $N_S$ of the stator poles 117 and a second quantity $N_R$ of the rotor poles 127, generating a number of angular steps. An angular step is defined as equal to the difference between the rotor pole pitch and the stator pole pitch. Following these geometric definitions, the relationship between the quantities of stator/rotor poles ($N_S/N_R$), for the 3-phase switched reluctance motor 125 is determined in accordance to the relationship:

$$N_R = \tfrac{2}{3} N_S$$

$N_S$: number of stator poles and $N_R$: number of rotor poles;

For the 3-phase switched reluctance motor 125, $N_S$ is a multiple of 3 and $N_R$ is an integer.

Advantageously, the switched reluctance motor 125 has a quantity of the stator poles 117 that is between 8 and 24, and a quantity of the rotor poles 127 that is between 6 and 16.

In one advantageous embodiment, there are a quantity of 18 stator poles 117 and a quantity of 12 rotor poles 127, referred to as an 18/12 combination.

In one advantageous embodiment, there are a quantity of 24 stator poles 117 and a quantity of 16 rotor poles 127, referred to as a 24/16 combination.

In one advantageous embodiment, the switched reluctance motor 125 is configured as follows:

a machine outer diameter 167 that is less than 85 mm;
an active length 161 that is less than 50 mm;
an airgap length 162 that is between 0.1-0.5 mm;
a ratio of the rotor pole arc 163 $A_R$ and the stator pole arc 166 $A_S$ that is greater than or equal to 1.0. Advantageously, the ratio $A_R/A_S$ is between 1.0 and 1.2;
a ratio of the stator diameter 167 ds and a rotor diameter 168 $d_R$ that is at least 2.0:1. Advantageously, the ratio $d_S/d_R$ is between 1.8 and 2.5; and
a ratio of the stator pole length 165 hs and the rotor pole length 164 $h_R$ that is equal or greater than 2.5. Advantageously, the ratio $h_S/h_R$ is between 2.1 and 2.5.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

FIG. 4 schematically shows an embodiment of a circuit 400 for the power inverter 110, which is an element of the electronic commutator subassembly 115 for controlling operation of an embodiment of the switched reluctance motor 125 of the starter 100. The switched reluctance motor 125 is configured as a three-phase device. The circuit 400 is configured to supply pulsewidth-modulated electric power originating from the DC power source 104 to the stator windings of the switched reluctance motor 125, which are depicted as first, second and third stator windings 422, 432, 442, respectively. An example pulsewidth-modulated control scheme is indicated by a control graph, including Q1 corresponding to a control signal for the first stator winding 422, Q2 corresponding to a control signal for the second stator winding 432, and Q3 corresponding to a control signal for the third stator winding 442, all plotted against electrical degrees of rotation, which are indicated on the horizontal axis. Each of the first, second and third stator windings 422, 432, 442 is arranged in series with a corresponding first, second and third power switch 424, 434, 444, respectively, between a first high-voltage bus 412 and a low-voltage bus 414, which are electrically connected to the DC power source 104.

The first high-voltage bus 412 is electrically connected to the DC power source 104 via an intervening power control switch 415. Each junction of the first, second and third stator windings 422, 432, 442 and corresponding switch 424, 434, 444 is electrically connected to a second high-voltage bus 413 via a corresponding first, second and third diode 426, 436, 446, respectively. A fourth diode 456 provides a shunt/drain between the first high-voltage bus 412 and the low-voltage bus 414.

Activations and deactivations of the first, second and third power switches 424, 434, 444 and the power control switch 415 are controlled by gate drivers that are disposed in the MCU 128.

The first, second and third power switches 424, 434, 444 are operably controlled to transmit electric power from the DC power source 104 to the corresponding windings of the stator 118 to drive the switched reluctance motor 125. In one embodiment, the first, second and third power switches 424, 434, 444 are MOSFET devices. Alternatively, the first, second and third power switches 424, 434, 444 can be formed using a single one of or a plurality of paralleled MOSFETs, GaN FETs, SiC FETs, IGBTs or other type of semiconductor switches. The PCB structure may comprise an FR4 multi-layer board having suitable thickness copper interlayers. In other alternate examples, the power management portion may include a power module assembly instead of a PCB where microchips are directly mounted to a direct bonded copper (DBC) substrate. A sheet of copper or aluminum may be bonded to one or both sides of an insulated substrate (e.g. alumina or silicon nitride) with copper traces. The sheet can be pre-formed prior to firing or chemically etched using printed circuit board technology to form an electrical circuit, while a bottom sheet may be kept plain. In further examples, microchips may be connected to copper bus bars or on lead frame also having isolation conducive to electrical switching. Generally, a power management portion includes a plurality of switches configured to manage power from the power source and apply pulse width modulation (PWM) as discussed in more detail below. These switches can be packaged with leads ready for assembly on the PCB or may be formed "in die" and mounted on a copper lead frame and wire-bonded to make the electrical connections.

The circuit 400 for the power inverter 110 is configured as a modified (n+1) switch converter that is operable to control an embodiment of the switched reluctance motor 125 of the starter 100. Alternatively, the circuit 400 for controlling an embodiment of the switched reluctance motor 125 can be configured as an asymmetric half-bridge electrical converter, a bifilar winding electrical converter, a C-dump electrical converter, or another suitable electrical converter for transforming DC electric power to AC electric power that can be employed to control operation of an embodiment of the switched reluctance motor 125.

Figures 1, 5:
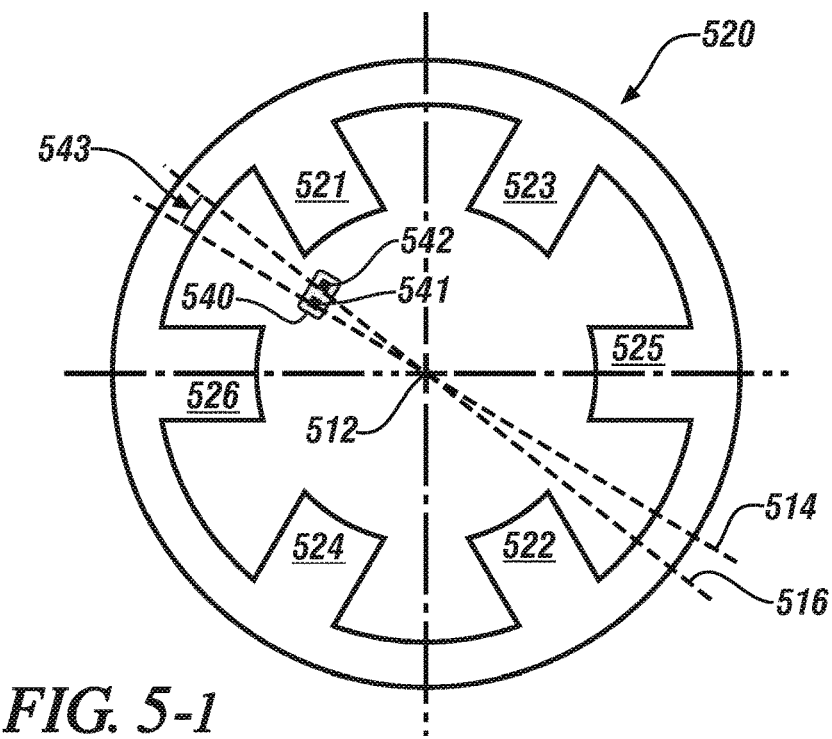
Figures 2, 5:
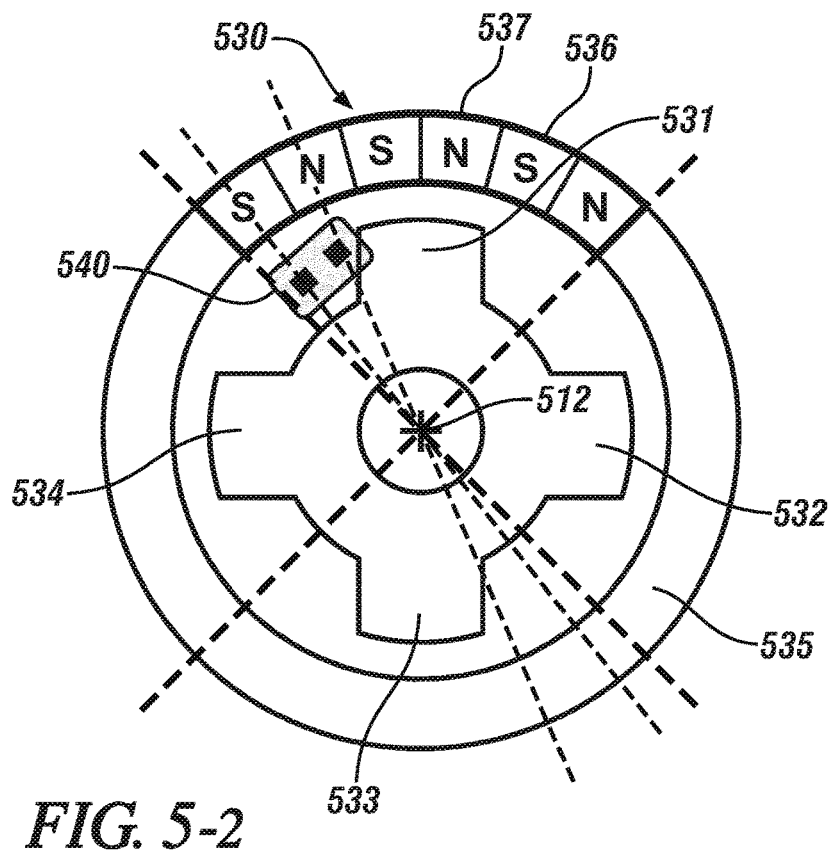
Figures 3, 5:
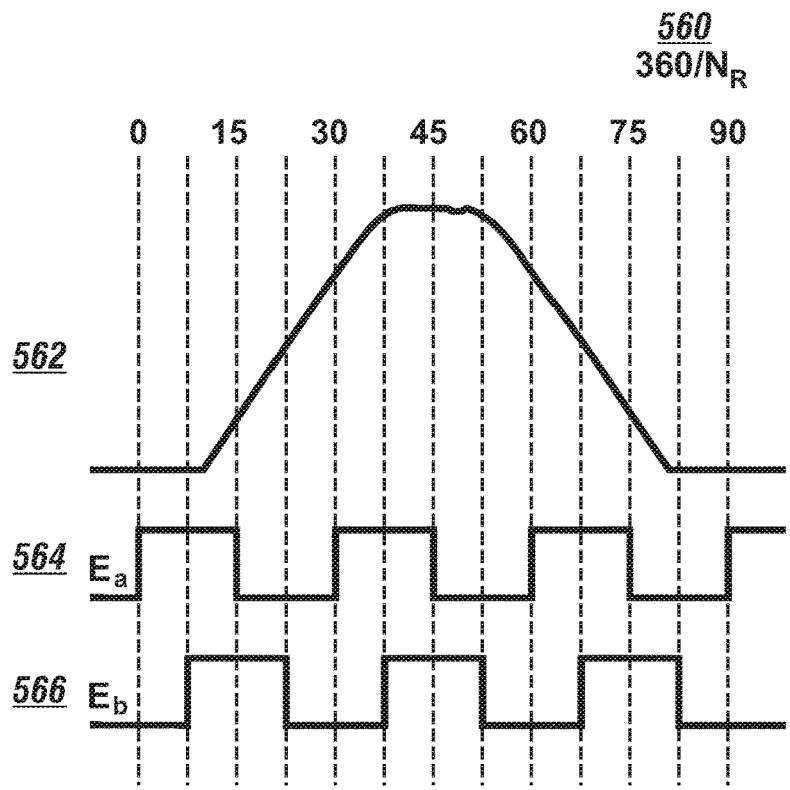

FIGS. 5-1, 5-2 and 5-3 provide additional details related to an embodiment of the position sensor 120 that is described with reference to FIGS. 1 and 2. FIG. 5-1 is a schematic end-view of a stator 520 and associated Hall effect sensor assembly 540 for an embodiment of the switched reluctance electric motor 125 that is described with reference to FIGS. 1 and 2. In one embodiment, the switched reluctance electric motor is configured as a three-phase electric motor, and the stator 520 is configured as a 6 pole device in this embodiment. The stator 520 includes three pole pairs, including a first pole pair A-A', indicated by numerals 521 and 522, respectively, a second pole pair B-B', indicated by numerals 523 and 524, respectively, and a third pole pair C-C', indicated by numerals 525 and 526, respectively. An axis of rotation 512 is defined in the geometric center of the stator 520. The Hall effect sensor assembly 540 is assembled onto an endcap of the electric motor (not shown), and includes a first Hall effect sensing element 541 and a second Hall effect sensing element 542. A first radial line 514 and a second radial line 516 are indicated, and are rotationally separated by an angle of rotation 543. The first radial line 514 defines a first location that is associated with placement of the first Hall effect sensing element 541 and the second radial line 516 is associated with placement of the second Hall effect sensing element 542. The angle of rotation 543 is selected to provide an angle of circumferential separation between the first and second Hall effect sensing elements 541, 542 that is defined by a single pole-pitch for the configuration of the electric motor. A pole-pitch is defined as a peripheral or circumferential distance between two adjacent poles in the electric motor. In this embodiment, the pole-pitch is 90 electrical degrees.

FIG. 5-2 is a schematic end-view of an embodiment of the rotor 530 and an associated rotor magnet 535. The rotor magnet 535 is an annular device that is coupled to the rotor 530 at one end and is adjacent to the Hall-effect sensor assembly 540. The rotor magnet 535 rotates in concert with the rotor 530. In one embodiment, and as shown, the rotor 530 includes a first rotor pole pair, indicated by numerals 531, 533, and a second rotor pole pair, indicated by numerals 532, 534. The rotor magnet 535 is arranged as a plurality of circumferentially-disposed magnet pole pairs that each include a north (N) pole 537 and a south (S) pole 536. A portion of the magnet 535 associated with a single rotor pole is detailed with a quantity of three circumferentially-disposed alternating N/S magnet pole pairs associated with the single rotor pole being shown. The first and second Hall effect sensing elements 541, 542 are positioned at a radial distance from the axis of rotation 512 that is equivalent to a radius that is defined by the rotor magnet 535. This arrangement of the Hall-effect sensor assembly 540 causes to the first and second Hall effect sensing elements 541, 542 to be proximal to the rotor magnet 535, and thus able to detect rotation of the rotor magnet 535. This arrangement of the Hall-effect sensor assembly 540 with the first and second Hall effect sensing elements 541, 542 and the associated rotor magnet 535 with three circumferentially-disposed alternating N/S magnet pole pairs being associated with the single rotor pole allows the Hall-effect sensor assembly 540 to be able to discern rotation of the rotor 530 at a resolution of 7.5 degrees of electrical rotation in one embodiment.

FIG. 5-3 is a graphical depiction of signal outputs 564, 566 from the first and second Hall effect sensing elements 541, 542, respectively, of the Hall effect sensor assembly 540 and associated inductance output 562 from the switched reluctance electric motor shown in relation to rotational position 560 of the rotor 530. Such information can be employed to control the phase current that is supplied by control of the first, second and third power switches 424, 434, 444 (shown with reference to FIG. 4) to transmit electric power from the DC power source 104 to the corresponding windings of the stator 118 to drive the switched reluctance motor 125.

Features associated with the switched reluctance machine (SRM) 125 include robustness, simplicity of machine construction, a desirable fail-safe capability and quasi-insensitivity to motor temperature. Unlike other types of electric motors, SRM has no brushed commutator, no permanent magnets, no rotor winding, and no squirrel cage, which make it capable of high speed operation and fast response due to low inertia. The performance is independent of the environment temperature during the current-controlled mode of operation. The machine performance depends on the stator ohmic resistance in a single pulse mode of operation. This stator ohmic resistance is based upon the winding temperature. There are desired combinations of pole numbers and phases for the SRM to be self-starting, symmetrical, reversible, and low-cost for a fast starter application.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A starter for an internal combustion engine, comprising:
   a multi-phase switched reluctance electric motor including a rotor and a stator;
   a pinion gear coupled to the rotor of the switched reluctance electric motor;
   an electronic commutator subassembly including an electronic motor control unit, a power inverter, and a rotational position sensor that are integrated as a single unit, including the power inverter being electrically connected to the stator of the switched reluctance electric motor; and
   an annular position magnet disposed on an end of the rotor proximal to the rotational position sensor;
   wherein:
   the rotor includes a quantity of rotor poles that is within a range between 6 and 16,
   the stator includes a quantity of stator poles that is within a range between 8 and 24,
   an outer diameter of the switched reluctance electric motor is less than 85 mm,
   an active length of the switched reluctance electric motor is less than 50 mm, an airgap distance between the rotor and the stator that is within a range between 0.1 mm and 0.5 mm, a ratio between a rotor pole arc and a stator pole arc is at least 1.0:1, a ratio between a stator diameter and a rotor diameter is at least 2.0:1, and a ratio between a stator pole height and a rotor pole height is at least 2.5:1.

2. The starter of claim 1, wherein the quantity of stator poles differs from the quantity of rotor poles.

3. The starter of claim 1, wherein the quantity of stator poles is 18 and the quantity of rotor poles is 12.

4. The starter of claim 1, wherein the quantity of stator poles is 24 and the quantity of rotor poles is 16.

5. The starter of claim 1, wherein the pinion gear is disposed to translate along a rotatable member coupled to the rotor.

6. The starter of claim 1, wherein the multi-phase switched reluctance electric motor comprises a three-phase switched reluctance electric motor.

7. The starter of claim 1, wherein the rotational position sensor includes a first Hall effect sensing element and a second Hall effect sensing element, wherein the first Hall effect sensing element is separated from the second Hall effect sensing element by an angle of rotation, and wherein the angle of rotation is selected to provide an angle of separation between the first and second Hall effect sensing elements that is defined by a single pole-pitch for the annular position magnet.

8. The starter of claim 1, wherein the annular position magnet disposed on the end of the rotor comprises a plurality of circumferentially-disposed magnet pole pairs that each include a north pole and a south pole.

9. The starter of claim 1, wherein the power inverter connected to the stator of the switched reluctance electric motor comprises first, second and third power switches and corresponding stator poles associated with respective first, second and third phases of the switched reluctance electric motor.

10. The starter of claim 9, wherein the power inverter of the electronic commutator subassembly is arranged as a modified (n+1) switch converter.

11. A starter for an internal combustion engine, comprising:

a multi-phase switched reluctance electric motor including a rotor and a stator;

a pinion gear coupled to the rotor of the switched reluctance electric motor;

a power inverter connected to the stator of the switched reluctance electric motor; and an electronic motor control unit including a plurality of gate drivers, wherein the gate drivers are in communication with the power inverter;

wherein:

the rotor includes a quantity of rotor poles that is within a range between 6 and 16, the stator includes a quantity of stator poles that is within a range between 8 and 24, an airgap distance between the rotor and the stator that is within a range between 0.1 mm and 0.5 mm, a ratio between a rotor pole arc and a stator pole arc is at least 1.0:1, a ratio between a stator diameter and a rotor diameter is at least 2.0:1, and a ratio between a stator pole height and a rotor pole height is at least 2.5:1.

12. The starter of claim 11, wherein the quantity of stator poles is 18 and the quantity of rotor poles is 12.

13. The starter of claim 11, wherein the quantity of stator poles is 24 and the quantity of rotor poles is 16.

14. The starter of claim 11, wherein the multi-phase switched reluctance electric motor comprises a three-phase switched reluctance electric motor.

15. The starter of claim 11, further comprising a rotational position sensor that is disposed to monitor rotation of an annular position magnet that is disposed on the end of the rotor.

16. The starter of claim 15, wherein the rotational position sensor includes a first Hall effect sensing element and a second Hall effect sensing element, wherein the first Hall effect sensing element is separated from the second Hall effect sensing element by an angle of rotation, and wherein the angle of rotation is selected to provide an angle of separation between the first and second Hall effect sensing elements that is defined by a single pole-pitch for the annular position magnet.

17. The starter of claim 15, wherein the annular position magnet disposed on the end of the rotor comprises a plurality of circumferentially-disposed magnet pole pairs that each include a north pole and a south pole.

18. The starter of claim 11, wherein the power inverter connected to the stator of the switched reluctance electric motor comprises first, second and third power switches and corresponding stator poles associated with respective first, second and third phases of the switched reluctance electric motor.

19. The starter of claim 18, wherein the power inverter of the electronic commutator subassembly is configured as one of a modified (n+1) switch converter, an asymmetric half-bridge electrical converter, a bifilar winding electrical converter, or a C-dump electrical converter.

20. A starter, comprising:

a multi-phase switched reluctance electric motor including a rotor and a stator;

a pinion gear slidably coupled to the rotor of the switched reluctance electric motor;

an electronic commutator subassembly including an electronic motor control unit, a power inverter, and a rotational position sensor that are integrated as a single unit, wherein the power inverter connected includes first, second and third power switches and corresponding stator poles associated with respective first, second and third phases of the switched reluctance electric motor, and wherein the power inverter of the electronic commutator subassembly is configured as one of a modified (n+1) switch converter; and a rotational position sensor that is disposed to monitor rotation of an annular position magnet that is disposed on the end of the rotor;

wherein:

the rotor includes a quantity of rotor poles that is within a range between 6 and 16, the stator includes a quantity of stator poles that is within a range between 8 and 24, a ratio between a rotor pole arc and a stator pole arc is at least 1.0:1, a ratio between a stator diameter and a rotor diameter is at least 2.0:1, a ratio between a stator pole height and a rotor pole height is at least 2.5:1, wherein an outer diameter of the switched reluctance electric motor is less than 85 mm, and wherein an active length of the switched reluctance electric motor is less than 50 mm, and wherein an airgap distance between the rotor and the stator is between 0.1 mm and 0.5 mm.

* * * * *